(12) United States Patent
Jo et al.

(10) Patent No.: US 8,588,124 B2
(45) Date of Patent: Nov. 19, 2013

(54) METHOD AND APPARATUS FOR DATA COMMUNICATION IN RADIO NETWORK

(75) Inventors: Jun Ho Jo, Anyang-si (KR); Seong Lyun Kim, Anyang-si (KR); Hyun Kwan Lee, Anyang-si (KR); Yong Ho Seok, Anyang-si (KR)

(73) Assignees: LG Electronics Inc., Seoul (KR); Industry-Academic Corporation Foundation, Yonsei University, Seoul (KR)

( * ) Notice: Subject to any disclaimer, the term of this patent is extended or adjusted under 35 U.S.C. 154(b) by 131 days.

(21) Appl. No.: 13/143,693

(22) PCT Filed: Jan. 6, 2010

(86) PCT No.: PCT/KR2010/000069
§ 371 (c)(1),
(2), (4) Date: Jul. 7, 2011

(87) PCT Pub. No.: WO2010/079952
PCT Pub. Date: Jul. 15, 2010

(65) Prior Publication Data
US 2011/0268012 A1    Nov. 3, 2011

Related U.S. Application Data

(60) Provisional application No. 61/143,393, filed on Jan. 8, 2009.

(30) Foreign Application Priority Data

Sep. 4, 2009  (KR) .......................... 10-2009-0083681

(51) Int. Cl.
*H04J 4/00* (2006.01)

(52) U.S. Cl.
USPC ........................................................ 370/312

(58) Field of Classification Search
None
See application file for complete search history.

(56) References Cited

U.S. PATENT DOCUMENTS

| | | | |
|---|---|---|---|
| 8,140,849 B2 * | 3/2012 | Rodriguez et al. ............ | 713/176 |
| 2004/0100986 A1 * | 5/2004 | Lee et al. ...................... | 370/443 |
| 2005/0058151 A1 | 3/2005 | Yeh | |
| 2007/0070896 A1 | 3/2007 | Alapuranen et al. | |
| 2007/0263613 A1 * | 11/2007 | Hara et al. .................... | 370/356 |
| 2007/0286102 A1 * | 12/2007 | Shimokawa et al. ......... | 370/310 |
| 2009/0067533 A1 * | 3/2009 | Yuan et al. .................... | 375/267 |

FOREIGN PATENT DOCUMENTS

| | | |
|---|---|---|
| KR | 10-2005-0036150 A | 4/2005 |
| KR | 10-2006-0104381 A | 10/2006 |

* cited by examiner

*Primary Examiner* — John Blanton
(74) *Attorney, Agent, or Firm* — Birch, Stewart, Kolasch & Birch, LLP

(57) ABSTRACT

Disclosed is a method for data communication in a radio network, including calculating an expected value of transmission efficiency of a Carrier Sense Multiple Access/Collision Avoidance (CSMA/CA) protocol and an expected value of transmission efficiency of a Slotted ALOHA protocol, comparing the two expected values, switching a mode into the mode of the protocol having the larger expected value from among the expected value of transmission efficiency of the CSMA/CA protocol and the expected value of transmission efficiency of Slotted ALOHA protocol, and broadcasting, to stations (STAs), a message for indicating the STAs to switch a protocol into the protocol having the larger expected value of transmission efficiency, and transmitting data by using the protocol having the larger expected value of transmission efficiency.

11 Claims, 4 Drawing Sheets

METHOD AND APPARATUS FOR DATA COMMUNICATION IN RADIO NETWORK

This application is the National Phase of PCT/KR2010/000069 filed on Jan. 6, 2010, which claims priority under 35 U.S.C. 119(e) to U.S. Provisional Application No. 61/143,393 filed on Jan. 8, 2009 and under 35 U.S.C. 119(a) to Patent Application No. 10-2009-0083681 filed in Republic of Korea on Sep. 4, 2009, all of which are hereby expressly incorporated by reference into the present application.

TECHNICAL FIELD

The present invention relates to wireless communication, and more particularly, to a method and apparatus for data communication in a radio network.

BACKGROUND ART

Representative examples of a related art packet-based transmission technique include Slotted ALOHA and Carrier Sense multiple Access (CSMA) techniques. In the Slotted ALOHA, when a packet to be transmitted is generated in each node under the circumstance where time synchronization between nodes participating in every transmission has been made, the packet is transmitted during the next time slot. Simultaneous transmission made by at least two nodes during a single time slot is called collision, and in the case of collision, packets undergo transmission failure and are re-transmitted after waiting for a random time slot. An ALOHA protocol is significantly simple but an ALOHA-based transmission scheme has lower performance than CSMA and thus is being used in satellite communication for national defense, radio-frequency identification (RFID) and the like using a small bandwidth.

The CSMA technique includes a carrier sensing process in which before transmission, it is checked whether or not someone else is carrying out transmission through a channel. If there is information to be sent, a packet is transmitted when it is determined that no one is using a channel as a result of the carrier sensing. By using this process, the probability of collision, caused by simultaneous transmission by two nodes as in the Slotted ALOHA, may be reduced. Ethernet, constituting a Local Area Network (LAN), adopts CSMA/Collision Detection (CD) additionally equipped with a collision detection function. As for the CSMA/CD, channel sensing is continuously performed even during transmission, and the transmission is stopped when transmission by another node is detected. In a wireless LAN, (WLAN), CSMA/Collision Avoidance (CA) is used to avoid collision. Since transmission and reception cannot be performed at the same time in a radio environment, the CSMA/CD cannot be used, and the CSMA/CA is used in order to address a hidden node problem. In the CSMA/CA, the process of determining which node will perform transmission may be performed by using a Request to Send (RTS) message and a Clear to Send (CTS) message.

The biggest issue of the Slotted ALOHA is the occurrence of collision. The collision degrades the traffic volume of a network.

The problem of the CSMA is that since every node has the same transmission probability value, heavy load on an access point cannot be effectively dealt with.

DISCLOSURE

Technical Problem

According to an embodiment of the present invention, there is provided a method for data communication in a radio network, capable of achieving an overall increase in the traffic volume of a network, and preventing heavy load on an access point (AP).

Technical Solution

According to an aspect of the present invention, there is provided a method for data communication in a radio network, including: calculating an expected value of transmission efficiency of a Carrier Sense Multiple Access/Collision Avoidance (CSMA/CA) protocol and an expected value of transmission efficiency of a Slotted ALOHA protocol; comparing the two expected values, switching a mode into the mode of the protocol having the larger expected value from among the expected value of transmission efficiency of the CSMA/CA protocol and the expected value of transmission efficiency of Slotted ALOHA protocol, and broadcasting, to stations (STAs), a message for indicating the STAs to switch a protocol into the protocol having the larger expected value of transmission efficiency; and transmitting data transmission by using the protocol having the larger expected value of transmission efficiency.

According to another aspect of the present invention, there is provided a method for data communication in a radio network, including: executing a P2P application and establishing a session with a counterpart station (STA); receiving information regarding a protocol to be used in data transmission from an access point (AP); and carrying out data communication by using a Carrier Sense Multiple Access/Collision Avoidance (CSMA/CA) protocol and a Slotted ALOHA protocol according to the information regarding the protocol.

Advantageous Effects

According to an embodiment of the present invention, in a peer-to-peer (P2P) transmission scheme where stations (STAs) exchange information with each other through an access point (AP), all the STAs as well as the AP selectively use a Slotted ALOHA or Carrier Sense Multiple Access/Collision Avoidance (CSMA/CA)—based transmission protocol, and the AP processes information received from peripheral STAs by using a network coding technique and then transmits it using the selected transmission protocol, thus reducing the number of transmissions. Accordingly, the overall traffic volume of a network can be increased, and excessive load on the AP can be prevented by adjusting contention window values.

MODE FOR INVENTION

Hereinafter, embodiments of the present invention will be described with reference to accompanying drawings. In the following embodiments, a radio network is based on a Slotted ALOHA protocol and a Carrier Sense Multiple Access/Collision Avoidance (CSMA/CA) protocol, and each of stations (STA) and an access points (AP) are all capable of not only the Slotted ALOHA-based transmission but also CSMA/CA-based transmission with a carrier sensing function. Each STA can freely change the size of a contention window according to a signal of the AP. Furthermore, all of the AP and the STAs operate in half-duplex. Such a radio network may include 1) STAs, and 2) an AP capable of receiving transmission signals from peripheral STAs, demodulating respective signals, modulating a plurality of signals into a single signal, and transmitting the signal.

The STA refers to a random functional medium including Medium Access Control (MAC) conforming to the IEEE 802.11 standard, and a physical layer interface for a wireless medium, and in a broader sense, the STA covers the AP and a non-AP station.

Among STAs, mobile terminals manipulated by users are non-AP STAs (STA1, STA3 and STA4). When simply called STA, it may indicate a Non-AP STA. The Non-AP STA may be called other terms such as a terminal, a wireless transmit/receive Unit (WTRU), user equipment (UE), a mobile station (MS), a mobile terminal, or a mobile subscriber unit, and the like.

Also, an AP is a functional entity that provides access to DS by way of a wireless medium for an associated station (STA). In infrastructure BSS including an AP, it is the principle that communication between non-AP STAs is made via an AP. However, if a direct link is established, direct communication between non-AP STAs is possible. The AP may be referred to as a convergence controller, a base station (BS), a node-B (Node-B), a base transceiver system (BTS), a site controller, or the like, besides an access point.

Figure 1:
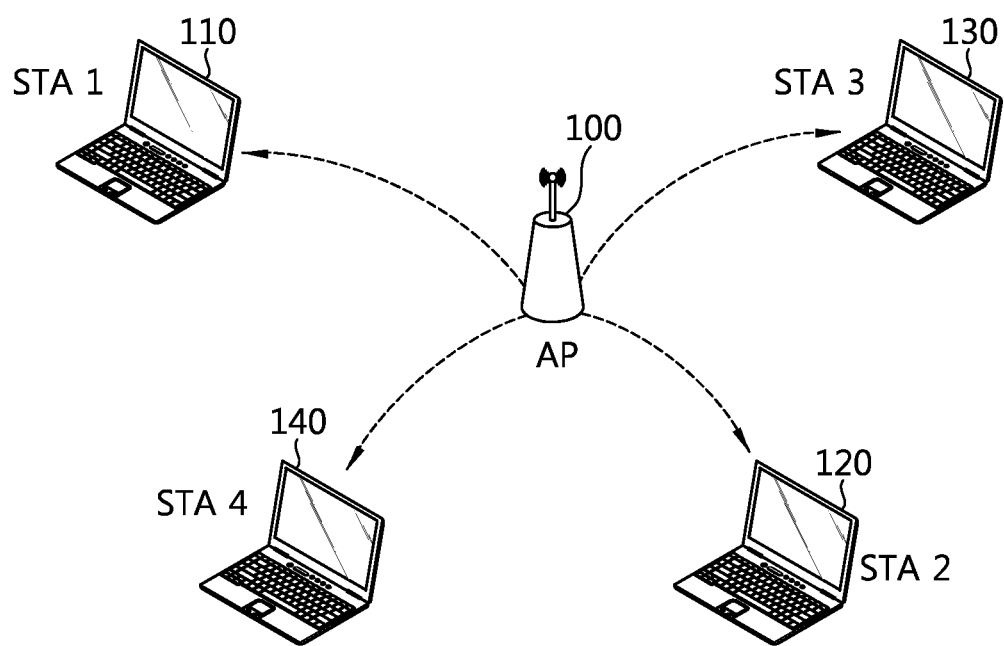
FIG. 1 is a schematic diagram showing the configuration of a P2P session in a radio communication network.

FIG. 1 is a schematic diagram showing the configuration of a P2P session in a radio communication network to which an embodiment of the present invention is applicable.

Referring to FIG. 1, a radio communication network includes an AP 100, and STA1 110, STA2 120, STA3 130 and STA4 140 constituting a peer to peer (P2P) session through the AP 100. In this embodiment, it is assumed that each of the STA1 110, the STA2 120, the STA3 130 and the STA4 140 forms a P2P session for the ease of description. However, the present invention is not limited to the description, and a plurality of APs and a plurality of STAs may exist.

Both of two P2P sessions, the P2P session of the STA1 110 and the STA2 120 and the P2P session of the STA3 130 and the STA4, are configured via the AP. Thus, all four STAs, that is, the STA1 to STA4, transmit information to the AP 100, and receive a counterpart STA from the AP 100.

According to an embodiment of the present invention, in a case where the STA1 110 and the STA2 120 perform data communication through the AP, the STA1 110 and the STA2 120 may perform communication by using a protocol with better transmission efficiency between a Slotted ALOHA protocol and a CSMA/CA protocol.

Figure 2:
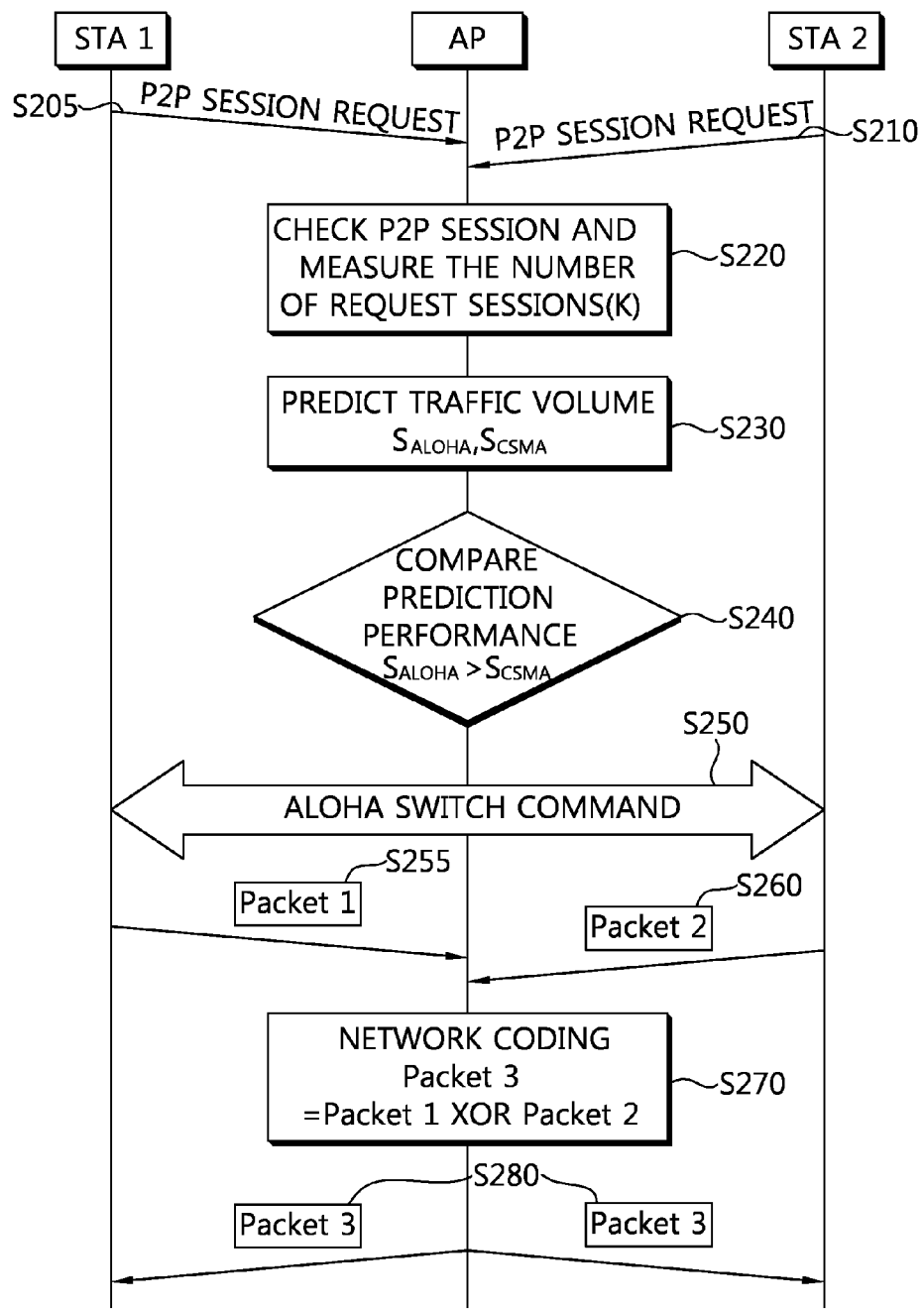
FIG. 2 is a flowchart showing a data communication process in a radio network according to an embodiment of the present invention.

FIG. 2 is a flowchart illustrating protocol switching of an AP and STAs, and data communication according to the Slotted ALOHA protocol, according to an embodiment of the present invention.

Referring to FIG. 2, an STA1 transmits a P2P session request message to the AP (S205). The AP checks a current P2P session and measures the number of request sessions, namely, the number (k) of STAs having requested the P2P session (S220). The AP predicts the traffic volume $S_{ALOHA}$ and $S_{CSMA}$ that can be obtained when the Slotted ALOHA protocol and the CSMA/CA protocol are used in a current session situation (i.e., expected values of transmission efficiency).

A factor that determines the network traffic volume in the Slotted ALOHA protocol is the transmission probability values of each STA and the AP. If a transmission probability value is excessively high, the number of transmissions occurring in a single time slot becomes excessive. This brings about numerous transmission failures due to the half-duplex condition that reception and transmission cannot be made at the same time, and weakens the intensity of reception signals due to interference between signals being simultaneously transmitted. Accordingly, the minimum signal intensity for demodulation cannot be achieved, which may also bring about transmission failure. Meanwhile, if an excessively low transmission probability is used, a radio channel cannot be efficiently used, and the number of time slots being dropped increases, reducing traffic volume.

Under this circumstance, transmission probability values that maximize network traffic volume are difference between the STA and the AP. The transmission probability value is a probability value that maximizes the traffic volume of the entire network while satisfying the condition that makes the total amount of information received by the AP equal to the total amount of information transmitted by the AP. The transmission probability p* of each STA and the transmission probability $P_C$ of the AP may be obtained as follows:

$$p^* = \frac{a + ka - (a^2 - 2ka + k^2a^2 + 2ak^2)^{1/2}}{k(2a-k)}, \quad \text{[Equation 1]}$$

$$a = \exp\left(\frac{-\theta N_0}{P_0 d_0^{-\alpha}}\right)$$

$$p_c = \frac{kp^*}{2(1-p^*)a + kp^*} \quad \text{[Equation 2]}$$

In Equation 1 and Equation 2, k is the number of STAs, θ is the minimum Signal to Interference Noise Ratio (SINR) for demodulating a received signal, $N_0$ is the magnitude of noise, $P_0$ is transmission power, $d_0$ is a distance between the STA and the AP, and α is an attenuation ratio of signal over distance.

The performance in a case where network coding is applied in the ALOHA protocol may be approximated by using the optimum p* value, obtained in the above manner, as follows:

$$S_{ALOHA} = 2a^2 L p_c (1-p^*)^k \quad \text{Equation 3}$$

When k, the number of STAs requesting the P2P session, increases, the optimum probability value is adaptively applied in the Slotted ALOHA, and in this way, load on the AP can be reduced, thus optimizing the traffic transmitted throughout the entire network.

Meanwhile, the mathematical performance of the CSMA can be obtained as follows:

$$S_{CSMA} = \frac{2\tau(1-\tau)^k a \cdot L}{(1-\tau)^{k+1}\delta + (k+1)\tau(1-\tau)^k T_s + \{1-(1-\tau)^k(1-\tau k - 2\tau)\}T_c} \quad \text{[Equation 4]}$$

τ is a transmission probability and is determined by the size of a congestion window of the CSMA system and the number of re-transmission stages, k is the number of STAs constituting the P2P session, and L is the traffic volume per unit frequency. δ, Ts, and Tc used in the denominator are the time required for dropping without channel access, the time required for the completion of transmission, and the time required for dropping in the case of collision in the CSMA system, respectively, and they are determined by the characteristics of the CSMA system.

The variables of Equation 3 and Equation 4 are values measured by the AP or values that are already known upon receiving information from the STAs in advance. The AP predicts $S_{ALOHA}$ and $S_{CSMA}$ from Equation 3 and Equation 4 (S230), and thereafter, prediction performance is compared (S240).

An example depicted in FIG. 2 shows a case where predicted traffic (an expected value of transmission efficiency) is greater when the Slotted ALOHA protocol is used ($S_{ALOHA} > S_{CSMA}$) as the result of the comparison of prediction performance (S240). That is, using the Slotted ALOHA protocol has a higher expected value of transmission efficiency.

In this case, the AP broadcasts, to STAs, an ALOH switch command message indicating the STAs to switch the mode to the Slotted ALOHA mode of using the Slotted ALOHA protocol so that data transmission can be performed by using the Slotted ALOHA protocol (S250). The ALOHA switch command message being broadcasted may include a transmission probability value which will be used in the data transmission of each of STAs, and the transmission probability may be p*, the optimum transmission probability used in determining the $S_{ALOHA}$ value.

Among the STAs having received the broadcasted ALOHA switch command message, STAs in the CSMA mode of using the CSMA/CA protocol switches the mode to the Slotted ALOHA mode of using the Slotted ALOHA protocol, and STAs in the Slotted ALOHA mode transmit data without mode switching. In the example of FIG. 2, the STA1 transmits packet1 to the AP by using the optimum transmission probability p* (S255), and the STA2 transmits packet2 to the AP by using the optimum transmission probability p* (S260).

All the STAs and the AP share a single radio channel by using the Slotted ALOHA protocol That is, every STA and the AP are synchronized in time slot, and participate in transmission with a predetermined probability in every time slot. In this circumstance, transmission failure occurs if multiple transmissions are simultaneously made or if a received signal fails to exceed a predetermined magnitude due to signal attenuation caused by a channel. Meanwhile, if the received signal exceeds a predetermined magnitude, a reception end can demodulate this signal.

Thereafter, the AP having received the Packet1 and the Packet2 performs network coding (S270). Here, the network coding may be performed in the following manner.

The AP receives the Packet1 and the Packet2, demodulates them, and combines them into a single signal by using a network coding scheme. The network coding is performed through an XOR operation upon a signal, made by demodulating signals received from two STAs, in the units of bits.

The AP multicasts a signal (Packet3), a signal combined through the network coding, to the STA1 and STA2 by also using the Slotted ALOHA protocol (S280). If simultaneously transmission to the two STAs fails, retransmission is performed by the transmission probability value ($p_c$).

Thereafter, the STA1 and the STA2 perform an XOR operation upon the data (Packet1 and Packet2) stored in a memory and respectively sent thereby and the data (Packet3) received from the AP, thus demodulating data sent thereto from a counterpart STA.

In the AP according to the existing general Slotted ALOHA method, network coding is not used in information exchange between STAs of both parties. In this case, at least four transmissions are required to exchange information of STAs constituting a single P2P session (two transmissions from respective STAs to AP, and two transmissions from AP to respective STAs). Meanwhile, if network coding is used, the AP does not transmit data to each of STAs but combines data to be transmitted to each STA into a single signal, and multicasts the signal so that this data can be transmitted to the two STAs at the same time. Accordingly, the total number of transmissions is reduced from four to three, making gain in terms of the number of transmissions.

In this method, a data transmitted to the AP from a plurality of STAs constituting a P2P session is subjected to network coding and thus made into a single packet, and the packet is multicast to the plurality of STAs.

Figure 3:
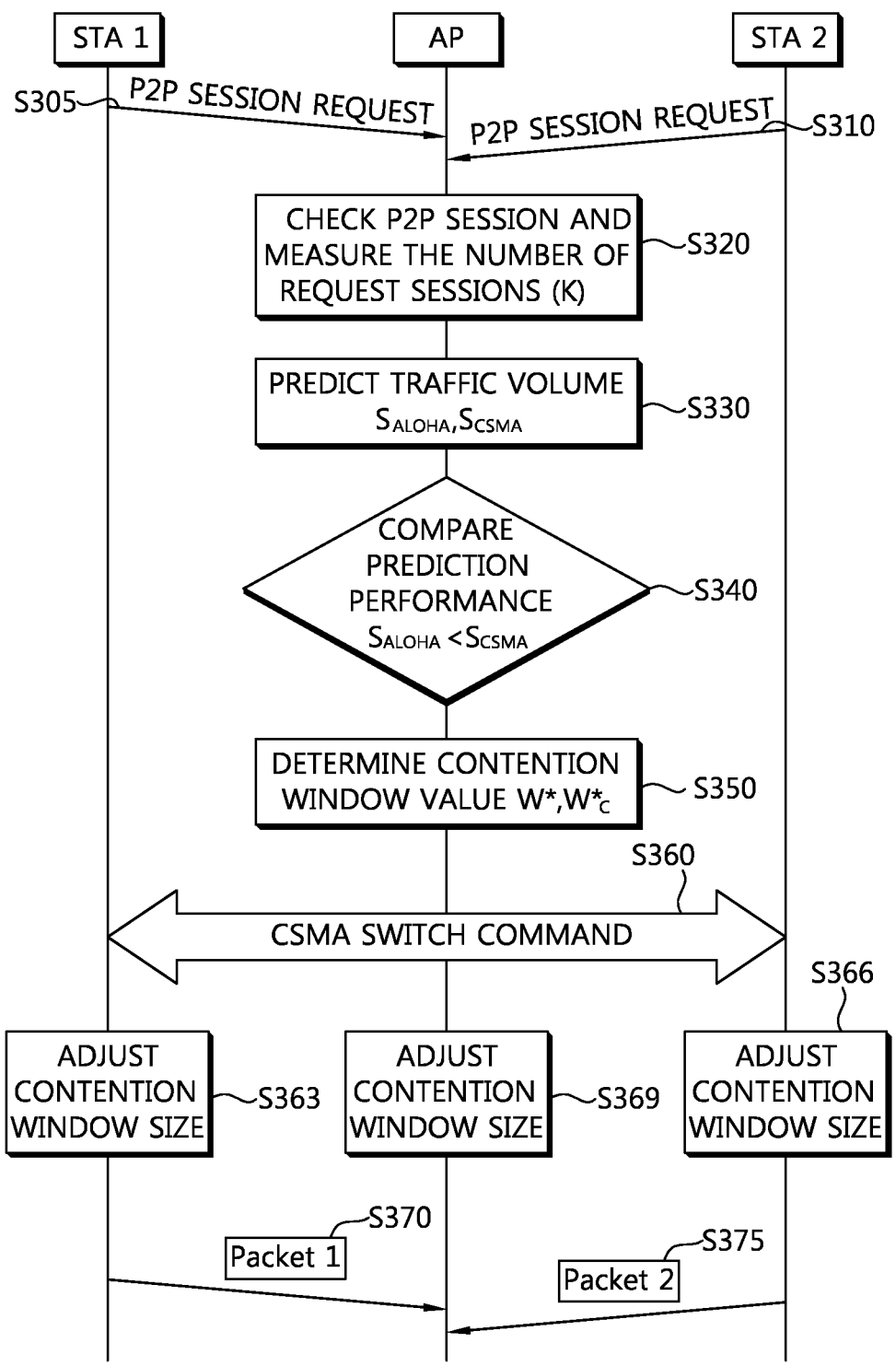
FIG. 3 is a flowchart showing a data communication process in a radio network according to another embodiment of the present invention.

FIG. 3 is a flowchart illustrating the process of a method for data communication in a radio network according to another embodiment of the present invention.

Referring to FIG. 3, the operations are the same as those described with reference to FIG. 2 from the operation of transmitting, by each of STAs which will constitute a P2P session, a P2P session request message to an AP, to the operation S330 of predicting traffic. Therefore, a detailed description thereof is omitted.

Unlike the embodiment of FIG. 2, FIG. 3 illustrates a case where the CSMA/CA protocol is used when predicted traffic, namely, an expected value of transmission efficiency, is high.

When an AP and STAs, constituting a radio network, do not support a contention window size, data communication is performed in the existing manner by using the related art CSMA/CA protocol. Here, a portion or all of the AP and the STAs constituting the radio network are those that are capable of controlling the contention window size, the contention window size controlled to increase traffic volume, namely, the optimum contention window value, is calculated, and the contention window size is controlled accordingly, thus performing data transmission. Hereinafter, a method for data communication will be described on the assumption that a portion or all of the AP and the STAs constituting a radio network can adjust the contention window size.

The AP determines optimum contention window values W* and Wc* of data transmission in a case where an expected value of transmission efficiency is higher when the CSMA/CA protocol is used ($S_{ALOHA} < S_{CSMA}$) (S350). Here, W* is a contention window value (the size of a contention window) of STAs, and Wc* is a contention window value (the size of a contention window) of the AP. W* and Wc* may be calculated from the transmission probability value of each of the STAs, which maximizes the next traffic volume.

[Equation 5]
$$\tau^* = \frac{\left[ 4q\delta k - \delta k + 2q\delta - \sqrt{\delta \left\{ \begin{array}{l} 4q\delta k(-4qk + 2k + 4q - 1) + \\ 8T_c kq(qk - 3q + k^2) + k^2\delta + 4q^2\delta \end{array} \right\}} \right]^{(-1/2)}}{k(-4q\delta k + 2k\delta + qT_c k - 3T_c q + T_c k^2)}$$

Equation 5 is an equation for obtaining the optimum transmission probability of an STA. Here, k is the number of STAs constituting a P2P session, δ is the time required for dropping without accessing a channel in a CSMA system, Tc is the time required for dropping when collision occurs and is given by the characteristics of the CSMA/CA protocol, θ as $$q = \exp\left(\frac{-N_0 \Theta}{P_0 r^{-\alpha}}\right)$$

is the minimum SINR for demodulating a received signal, $N_0$ is the magnitude of noise, $P_0$ is transmission power, r is a distance between an STA and an AP, and $\alpha$ is a signal attenuation rate according to the distance.

Based on the optimum transmission probability of an STA obtained from Equation 5, the W* and the $W_c$* may be obtained by using the following equations.

$$W^* = \frac{2}{\tau^*} - 1 \quad [\text{Equation 6}]$$

$$W_c^* = 2\left(1 + \frac{2q}{k}\left(\frac{1-\tau^*}{\tau^*}\right)\right) - 1 = \frac{\tau^* k + 4 - 4\tau^*}{\tau^* k} \quad [\text{Equation 7}]$$

In Equations 6 and 7, $\tau^*$ is the transmission probability of an STA obtained from Equation 5 above, k is the number of STAs constituting a P2P session, $\delta$ is the time required for dropping without accessing a channel in the CSMA system, Tc is the time required for dropping when collision occurs and is given by the characteristics of the CSMA/CA protocol, $\theta$ as $$q = \exp\left(\frac{-N_0 \Theta}{P_0 r^{-\alpha}}\right)$$

is the minimum SINR for demodulating a received signal, $N_0$ is the magnitude of noise, $P_0$ is transmission power, r is a distance between an STA and an AP, and $\alpha$ is a signal attenuation rate according to the distance.

The AP broadcasts a CSMA switch command message that indicates STAs to switch the mode to the CSMA mode of using the CSMA/CA protocol (S360). The CSMA switch command message being broadcasted may include the contention window value determined in operation S350.

Among the STAs having received the CSMA switch command message, STAs operating in the Slotted ALOHA mode switch the mode to the CSMA mode and then adjusts the size of a contention window according to the contention window value included in the CSMA switch command, and STAs already operating in the CSMA mode adjust only the size of the contention window (S363 and S366). In this case, as in the case of the STAs described as above, the AP switches its operating mode and then adjusts the size of the contention window or adjusts only the contention window size (S369).

Thereafter, the STA1 transmits data to the AP (S370), and the STA2 also starts data transmission to the AP (S375).

The AP having received data from the STA1 and the STA2 may perform multicasting by using network coding as in the case of FIG. 2, or may perform transmission to the STAs in a sequential order.

Figure 4:
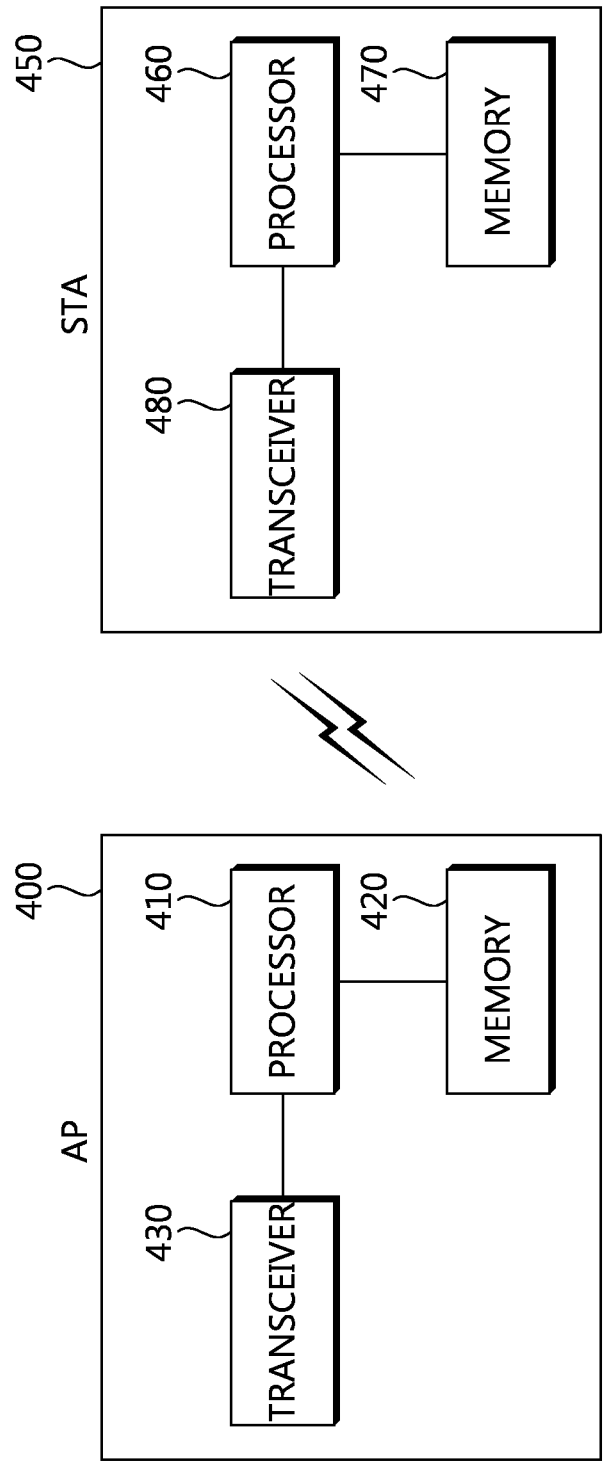
FIG. 4 is a block diagram of an access point (AP) and a station 9STA) supporting a method for data communication according to an embodiment of the present invention.

FIG. 4 is a block diagram showing an AP and an STA implementing an embodiment of the present invention. An AP 400 includes a processor 410, a memory 420, and a transceiver 430. An STA 450 includes a processor 460, a memory 470, and a transceiver 480. The transceivers 430 and 480 transmit/receive a radio signal, and implement the IEEE 803 physical layer. The processors 410 and 460 are connected to the transceivers 430 and 480, respectively, and implement the IEEE 802 MAC layer. The processors 410 and 460 may implement the above-described method for data communication by determining and comparing an expected value of transmission efficiency through the calculation of traffic according to the above protocol mode being used, and performing network coding, the determination of a contention window value and the like.

The processors 410 and 460 and/or the transceivers 430 and 480 may include an application-specific integrated circuit (ASIC), another chipset a logic circuit, and/or a data processor. The memories 420 and 470 may include a read-only memory (ROM), a random access memory (RAM), a flash memory, a memory card, a storage medium and/or another storage device. When an embodiment is embodied as software, the above technique may be implemented as a module (a process, a function or the like) that performs the above functions. The module may be stored in the memories 420 and 470 and may be executed by the processors 410 and 460. The memories 420 and 470 may be located inside or outside the processors 410 and 460, and may be connected to the processors 410 and 460 as well-known units, respectively.

In the above exemplary system, methods have been described based on flowcharts as a series of operations and blocks, but the present invention is not limited to the order of the operations. Operations may be performed simultaneously or one after another. Furthermore, those skilled in the art would understand that the operations are not exclusive to each other and another process may be included or one or more operations of the flowcharts may be deleted without affecting the scope of the present invention.

Although the embodiments of the present invention have been described above, a person having ordinary skill in the art will appreciate that the present invention may be modified and changed in various ways without departing from the technical spirit and scope of the present invention. Accordingly, the present invention is not limited to the above embodiments and the present invention may be said to include all embodiments within the scope of the claims below.

The invention claimed is:

1. A method for data communication in a radio network, the method comprising:

calculating an expected value of transmission efficiency of a Carrier Sense Multiple Access/Collision Avoidance (CSMA/CA) protocol and an expected value of transmission efficiency of a Slotted ALOHA protocol;

switching a mode into the mode of the protocol having the larger expected value from among the expected value of transmission efficiency of the CSMA/CA protocol and the expected value of transmission efficiency of Slotted ALOHA protocol;

broadcasting, to stations (STAs), a message for indicating the STAs to switch a protocol into the protocol having the larger expected value of transmission efficiency; and transmitting data by using the protocol having the larger expected value of transmission efficiency, wherein the expected value $S_{CSMA}$ of transmission efficiency of the CSMA/CA protocol and the expected value $S_{ALOHA}$ of transmission efficiency of the Slotted ALOHA protocol are determined by the following equations:

$$S_{CSMA} = \frac{2\tau(1-\tau)^k a \cdot L}{(1-\tau)^{k+1}\delta + (k+1)\tau(1-\tau)^k T_s + \{1 - (1-\tau)^k(1-\tau k - 2\tau)\}T_c}$$

$$S_{ALOHA} = 2a^2 L p_c (1 - p^*)^k$$

-continued

Where $$p^* = \frac{a + ka - (a^2 - 2ka + k^2a^2 + 2ak^2)^{1/2}}{k(2a-k)},$$

$$p_c = \frac{kp^*}{2(1-p^*)a + kp^*},$$

where τ is a transmission probability which is determined by the size of a congestion window of the CSMA/CA protocol and the number of retransmission stages, k is the number of STAs constituting a peer to peer (P2P) session, L is a traffic volume per unit frequency, δ is the time required for dropping without accessing a channel in a CSMA system, $T_s$ is the time required for completing transmission, $T_c$ is the time required for dropping when collision occurs and is given by characteristics of the CSMA/CA protocol, θ as $$a = \exp\left(\frac{-\theta N_0}{P_0 d_0^{-\alpha}}\right)$$

is a minimum signal to interference noise ratio (SINR) for demodulating a received signal, $N_0$ is a magnitude of noise, $P_0$ is transmission power, $d_0$ is a distance between an STA and an access point (AP), and α is a signal attenuation rate over a distance.

2. The method of claim 1, wherein when the data transmission is carried out by using the Slotted ALOHA protocol, the data transmission is performed through multicasting using network coding.

3. The method of claim 2, wherein the network coding is carried out by performing an Exclusive OR(XOR) operation upon a signal, made by demodulating signals received from two STAs establishing a P2P session, in units of bits.

4. The method of claim 1, wherein the data transmission is carried out according to a transmission probability $p_C$ value, which is a probability value maximizing a traffic volume of an entire network while satisfying a condition that makes the amount of information being received and the amount of information being transmitted equal to each other on average, wherein the transmission probability $p_C$ value is determined by the following equation:

$$p_c = \frac{kp^*}{2(1-p^*)a + kp^*}$$

where $$p^* = \frac{a + ka - (a^2 - 2ka + k^2a^2 + 2ak^2)^{1/2}}{k(2a-k)},$$

k is the number of STAs constituting a P2P session, θ as $$a = \exp\left(\frac{-\theta N_0}{P_0 d_0^{-\alpha}}\right)$$

is a minimum signal to interference noise ratio (SINR) for demodulating a received signal, $N_0$ is a magnitude of noise, $P_0$ is transmission power, $d_0$ is a distance between an STA and an access point (AP), and α is a signal attenuation rate over a distance.

5. The method of claim 1, further comprising:
when the data transmission is carried out by using the CSMA/CA protocol, determining a contention window size value of an access point (AP) and a contention window size value of the STAs;
broadcasting, to the STAs, information regarding the contention window size value of the STA; and
setting a contention window according to information regarding the contention window size value of the AP, and carrying the data transmission by using the CSMA/CA protocol.

6. The method of claim 5, wherein the contention window size value $W_c^*$ of the AP and the contention window size value W* of the STAs are determined by the following equation:

$$W^* = \frac{2}{\tau^*} - 1$$

$$W_c^* = 2\left(1 + \frac{2q}{k}\left(\frac{1-\tau^*}{\tau^*}\right)\right) - 1 = \frac{\tau^* k + 4 - 4\tau^*}{\tau^* k}$$

where $$\tau^* = \frac{(-1/2)\left[4q\delta k - \delta k + 2q\delta - \sqrt{\delta\left\{\begin{array}{l}4q\delta k(-4qk+2k+4q-1)+\\8T_c kq(qk-3q+k^2)+k^2\delta+4q^2\delta\end{array}\right\}}\right]}{k(-4q\delta k + 2k\delta + qT_c k - 3T_c q + T_c k^2)},$$

k is the number of STAs constituting a P2P session, δ is a time required for dropping without accessing a channel in a CSMA system, Tc is a time required for dropping when collision occurs and is given by characteristics of the CSMA/CA protocol, θ as $$q = \exp\left(\frac{-N_0 \Theta}{P_0 r^{-\alpha}}\right)$$

is a minimum signal to interference noise ratio (SINR) for demodulating a received signal, $N_0$ is a magnitude of noise, $P_0$ is transmission power, $d_0$ is a distance between the STA and the AP, and α is a signal attenuation rate over a distance.

7. A method for data communication in a radio network, comprising:
executing a P2P application and establishing a session with a counterpart station (STA);
receiving information regarding a protocol to be used in data transmission from an access point (AP); and
transmitting data by using a Carrier Sense Multiple Access/Collision Avoidance (CSMA/CA) protocol and a Slotted ALOHA protocol according to the information regarding the protocol,
wherein when the Slotted ALOHA protocol is used, the data communication comprises:
receiving data obtained by network coding from the AP; and
decoding the received network-coded data through an XOR operation in units of bits, and
wherein the data transmission to the AP is made with a transmission probability p* determined according to the following equation:

$$p^* = \frac{a + ka - (a^2 - 2ka + k^2a^2 + 2ak^2)^{1/2}}{k(2a - k)}$$

where k is the number of STAs constituting a P2P session, θ as $$a = \exp\left(\frac{-\theta N_0}{P_0 d_0^\alpha}\right)$$

is a minimum signal to interference noise ratio (SINR) for demodulating a received signal, $N_0$ is a magnitude of noise, $P_0$ is transmission power, $d_0$ is a distance between the STA and the AP, and α is a signal attenuation rate over a distance.

8. The method of claim 7, wherein when the CSMA/CA protocol is used, the data communication comprises:
receiving information regarding a contention window size from the AP;
configuring a size of a contention window according to the received information regarding the contention window size; and
carrying out the data communication.

9. The method of claim 8, wherein the data transmission to the AP is made with a transmission probability determined according to the following equation:

$$\tau^* = \frac{(-1/2)\left[4q\delta k - \delta k + 2q\delta - \sqrt{\delta\left\{\begin{array}{l}4q\delta k(-4qk + 2k + 4q - 1) + \\ 8T_c kq(qk - 3q + k^2) + k^2\delta + 4q^2\delta\end{array}\right\}}\right]}{k(-4q\delta k + 2k\delta + qT_c k - 3T_c q + T_c k^2)}$$

where k is the number of STAs constituting a P2P session, δ is a time required for dropping without accessing a channel in a CSMA system, Tc is a time required for dropping when collision occurs and is given by characteristics of the CSMA/CA protocol, θ as $$q = \exp\left(\frac{-N_0 \Theta}{P_0 r^{-\alpha}}\right)$$

is a minimum signal to interference noise ratio (SINR) for demodulating a received signal, $N_0$ is a magnitude of noise, $P_0$ is transmission power, r is a distance between the STA and the AP, and α is a signal attenuation rate over a distance.

10. An access point (AP), comprising:
a transceiver; and
a processor coupled with the transceiver operatively, the processor configured to:
calculate an expected value of transmission efficiency of a Carrier Sense Multiple Access/Collision Avoidance (CSMA/CA) protocol and an expected value of transmission efficiency of a Slotted ALOHA protocol;
switch a mode into the Slotted ALOHA protocol when the expected value of transmission efficiency of the Slotted ALOHA protocol is larger;
broadcast to stations (STAs) a message indicating the STAs to switch the mode into the Slotted ALOHA protocol;
calculate a contention window size value of the AP indicating mode switching to the CSMA/CA protocol and a contention window size value of the peripheral STAs when the expected value of transmission efficiency of the CSMA/CA protocol is larger; and
broadcast to the peripheral STAs information regarding the contention window size value of the peripheral STAs, wherein the expected value $S_{CSMA}$ of transmission efficiency of the CSMA/CA protocol and the expected value $S_{ALOHA}$ of transmission efficiency of the Slotted ALOHA protocol are determined by the following equations:

$$S_{CSMA} = \frac{2\tau(1-\tau)^k a \cdot L}{(1-\tau)^{k+1}\delta + (k+1)\tau(1-\tau)^k T_s + \{1-(1-\tau)^k(1-\tau k - 2\tau)\}T_c}$$

$$S_{ALOHA} = 2a^2 L p_c (1 - p^*)^k$$

where $$p^* = \frac{a + ka - (a^2 - 2ka + k^2a^2 + 2ak^2)^{1/2}}{k(2a - k)},$$

$$p_c = \frac{kp^*}{2(1-p^*)a + kp^*},$$

where τ is a transmission probability which is determined by the size of a congestion window of the CSMA/CA protocol and the number of retransmission stages, k is the number of STAs constituting a peer to peer (P2P) session, L is a traffic volume per unit frequency, δ is the time required for dropping without accessing a channel in a CSMA system, $T_s$ is the time required for completing transmission, $T_c$ is the time required for dropping when collision occurs and is given by characteristics of the CSMA/CA protocol, θ as $$a = \exp\left(\frac{-\theta N_0}{P_0 d_0^{-\alpha}}\right)$$

is a minimum signal to interference noise ratio (SINR) for demodulating a received signal, $N_0$ is a magnitude of noise, $P_0$ is transmission power, $d_0$ is a distance between an STA and an access point (AP), and α is a signal attenuation rate over a distance.

11. A station (STA), comprising:
a transceiver; and
a processor coupled with the transceiver operatively, the processor configured to:
establish a session with a counterpart STA by executing a P2P application;
transmit establishment information of the session to the AP;
receive information regarding a protocol to be used in data transmission; and
transmit data by using a Carrier Sense Multiple Access/Collision Avoidance (CSMA/CA) protocol or a Slotted ALOHA protocol,
wherein the expected value $S_{CSMA}$ of transmission efficiency of the CSMA/CA protocol and the expected value $S_{ALOHA}$ of transmission efficiency of the Slotted ALOHA protocol are determined by the following equations:

$$S_{CSMA} = \frac{2\tau(1-\tau)^k a \cdot L}{(1-\tau)^{k+1}\delta + (k+1)\tau(1-\tau)^k T_s + \{1-(1-\tau)^k(1-\tau k - 2\tau)\}T_c}$$

$$S_{ALOHA} = 2a^2 L p_c (1-p^*)^k$$

where $$p^* = \frac{a + ka - (a^2 - 2ka + k^2 a^2 + 2ak^2)^{1/2}}{k(2a-k)},$$

$$p_c = \frac{kp^*}{2(1-p^*)a + kp^*},$$

where $\tau$ is a transmission probability which is determined by the size of a congestion window of the CSMA/CA protocol and the number of retransmission stages, k is the number of STAs constituting a peer to peer (P2P) session, L is a traffic volume per unit frequency, $\delta$ is the time required for dropping without accessing a channel in a CSMA system, $T_s$ is the time required for completing transmission, $T_c$ is the time required for dropping when collision occurs and is given by characteristics of the CSMA/CA protocol, $\theta$ as $$a = \exp\left(\frac{-\theta N_0}{P_0 d_0^{-\alpha}}\right)$$

is a minimum signal to interference noise ratio (SINR) for demodulating a received signal, $N_0$ is a magnitude of noise, $P_0$ is transmission power, $d_0$ is a distance between an STA and an access point (AP), and $\alpha$ is a signal attenuation rate over a distance.

* * * * *